(12) United States Patent
Liu et al.

(10) Patent No.: US 12,288,116 B2
(45) Date of Patent: Apr. 29, 2025

(54) ELECTRONIC CARD CAPABLE OF LIGHT-EMITTING DISPLAY

(71) Applicant: BEAUTIFUL CARD CORPORATION, Taoyuan (TW)

(72) Inventors: Jen-Hsiang Liu, Taoyuan (TW); Jung-Hsiu Chen, Taoyuan (TW)

(73) Assignee: BEAUTIFUL CARD CORPORATION, Taoyuan (TW)

( * ) Notice: Subject to any disclaimer, the term of this patent is extended or adjusted under 35 U.S.C. 154(b) by 376 days.

(21) Appl. No.: 18/080,757

(22) Filed: Dec. 14, 2022

(65) Prior Publication Data

US 2023/0409860 A1 Dec. 21, 2023

(30) Foreign Application Priority Data

Jun. 16, 2022 (TW) .................................. 111122493

(51) Int. Cl.
*G06K 19/077* (2006.01)

(52) U.S. Cl.
CPC .............................. *G06K 19/07705* (2013.01)

(58) Field of Classification Search
CPC ............................................... G06K 19/07705
USPC ........................................................ 235/492
See application file for complete search history.

(56) References Cited

U.S. PATENT DOCUMENTS

2021/0056371 A1* 2/2021 Mosteller ......... G06K 19/06028

FOREIGN PATENT DOCUMENTS

| CN | 110956245 A | * | 4/2020 | ........... B42D 25/369 |
| KR | 20060038716 A | * | 5/2006 | ....... G06K 19/07705 |

* cited by examiner

*Primary Examiner* — Steven S Paik
*Assistant Examiner* — Tae W Kim

(57) ABSTRACT

An electronic card capable of light-emitting display includes a card body, electrical control module, light-emitting module and light-guiding module. The card body has a light-penetrable border portion having a surface on which an oblique refraction portion is disposed. The electrical control module is disposed in the card body and includes a circuit control carrier plate and a non-contact type radio-frequency antenna or a contact type communication chip. The light-emitting module is disposed in the card body and electrically connected to the circuit control carrier plate. The light-guiding module is disposed in the card body and corresponds in position to the light-emitting module. During personal data or transaction data exchange carried out with the card body, light emitted from the light-emitting module driven by the electrical control module is guided by the light-guiding module to the light-penetrable border portion, allowing the oblique refraction portion to increase display light brightness.

5 Claims, 3 Drawing Sheets

ELECTRONIC CARD CAPABLE OF LIGHT-EMITTING DISPLAY

CROSS-REFERENCE TO RELATED APPLICATION

This non-provisional application claims priority under 35 U.S.C. § 119(a) on Patent Application No(s). 111122493 filed in Taiwan, R.O.C. on Jun. 16, 2022, the entire contents of which are hereby incorporated by reference.

BACKGROUND OF THE INVENTION

1. Field of the Invention

The present disclosure relates to electronic card, and in particular to an electronic card capable of light-emitting display.

2. Description of the Related Art

Conventionally portable electronic cards, such as debit cards, credit cards, prepaid cards, public transport smart cards, health insurance cards, and smart ID cards, fall into two categories, namely contact type and non-contact type, depending on how they work. The contact type card has its chip exposed from the card and adapted to come into electrical contact with an external card reader, allowing the card reader to read required data in the chip to carry out a transaction. By contrast, an induction coil and an RFID tag thereof are embedded in the non-contact type card. When a user places the non-contact type card near a reading module, electric power is generated as a result of mutual inductance between an antenna of the reading module and the induction coil of the card, allowing the reading module to read data of the RFID tag to carry out a transaction.

However, the conventional contact type card or non-contact type card has a drawback. The card lacks any mechanism for giving a reminder to consumers. Thus, a consumer using a card to carry out a transaction and observing the card is not even able to determine whether the transaction is being carried out with the card; instead, the consumer will not be aware of whether the transaction carried out with the card is finished unless the dealer informs the consumer of this. As a result, during or after a transaction carried out with the card, it is possible for an unscrupulous dealer to steal personal data and transaction data in an RFID tag of the card with a related device.

Therefore, it is necessary to provide an electronic card capable of light-emitting display to not only give a reminder but also enable the electronic card to be pleasing in appearance while its card body is undergoing exchange of personal data or transaction data, thereby overcoming the aforesaid drawback of the prior art.

BRIEF SUMMARY OF THE INVENTION

In view of the aforesaid drawback of the prior art, it is an objective of the disclosure to provide an electronic card capable of light-emitting display to not only give a reminder but also enable the electronic card to be pleasing in appearance while exchange of personal data or transaction data is taking place.

In order to achieve the above and other objectives, the disclosure provides an electronic card capable of light-emitting display, comprising a card body, an electrical control module, a light-emitting module and a light-guiding module. A light-penetrable border portion is disposed on the periphery of the card body. An oblique refraction portion is disposed on a surface of the light-penetrable border portion. The electrical control module is disposed in the card body and comprises a circuit control carrier plate and a non-contact type radio-frequency antenna or a contact type communication chip. The non-contact type radio-frequency antenna or the contact type communication chip is disposed at the circuit control carrier plate. The light-emitting module is disposed in the card body and electrically connected to the circuit control carrier plate. The light-guiding module is disposed in the card body and corresponds in position to the light-emitting module. Light emitted from the light-emitting module is guided by the light-guiding module to the light-penetrable border portion of the card body.

Regarding the electronic card capable of light-emitting display, the card body comprises a first light-penetrable panel, a first shading portion, a second light-penetrable panel and a second shading portion. The first light-penetrable panel is coupled to the second light-penetrable panel. The first shading portion is disposed at the first light-penetrable panel. The second shading portion is disposed at the second light-penetrable panel. The oblique refraction portion is disposed at the first light-penetrable panel. The electrical control module, the light-emitting module and the light-guiding module are disposed between the first light-penetrable panel and the second light-penetrable panel.

Regarding the electronic card capable of light-emitting display, the first shading portion is smaller than the first light-penetrable panel, and the second shading portion is smaller than the second light-penetrable panel, allowing the light-penetrable border portion to form on the periphery of the card body.

Regarding the electronic card capable of light-emitting display, the light-guiding module is disposed between the first shading portion and the second shading portion and made of transparent PVC, PET, PC or PMMA material.

Regarding the electronic card capable of light-emitting display, the first light-penetrable panel and the second light-penetrable panel are coupled together by a light-penetrable coupling portion, and the light-penetrable coupling portion corresponds in position to the light-penetrable border portion and connects to a periphery of the light-guiding module.

Regarding the electronic card capable of light-emitting display, the light-emitting module has at least one light-emitting component disposed on a surface of the circuit control carrier plate, and the light-guiding module has a through hole for receiving the light-emitting component.

Regarding the electronic card capable of light-emitting display, at least one light masking portion is disposed on another surface of the circuit control carrier plate and under the light-emitting component.

Therefore, the disclosure provides an electronic card capable of light-emitting display and advantageously characterized in that, in the course of the personal data or transaction data exchange carried out with the card body, the electrical control module drives the light-emitting module to emit light, and then the light is guided by the light-guiding module to the light-penetrable border portion, allowing the oblique refraction portion to increase display light brightness. Therefore, the card body displays data exchange information to not only give a reminder but also render the electronic card pleasing in appearance.

DETAILED DESCRIPTION OF THE INVENTION

Objectives, features, and advantages of the disclosure are hereunder illustrated with specific embodiments, depicted with accompanying drawings, and described below.

Figure 1:
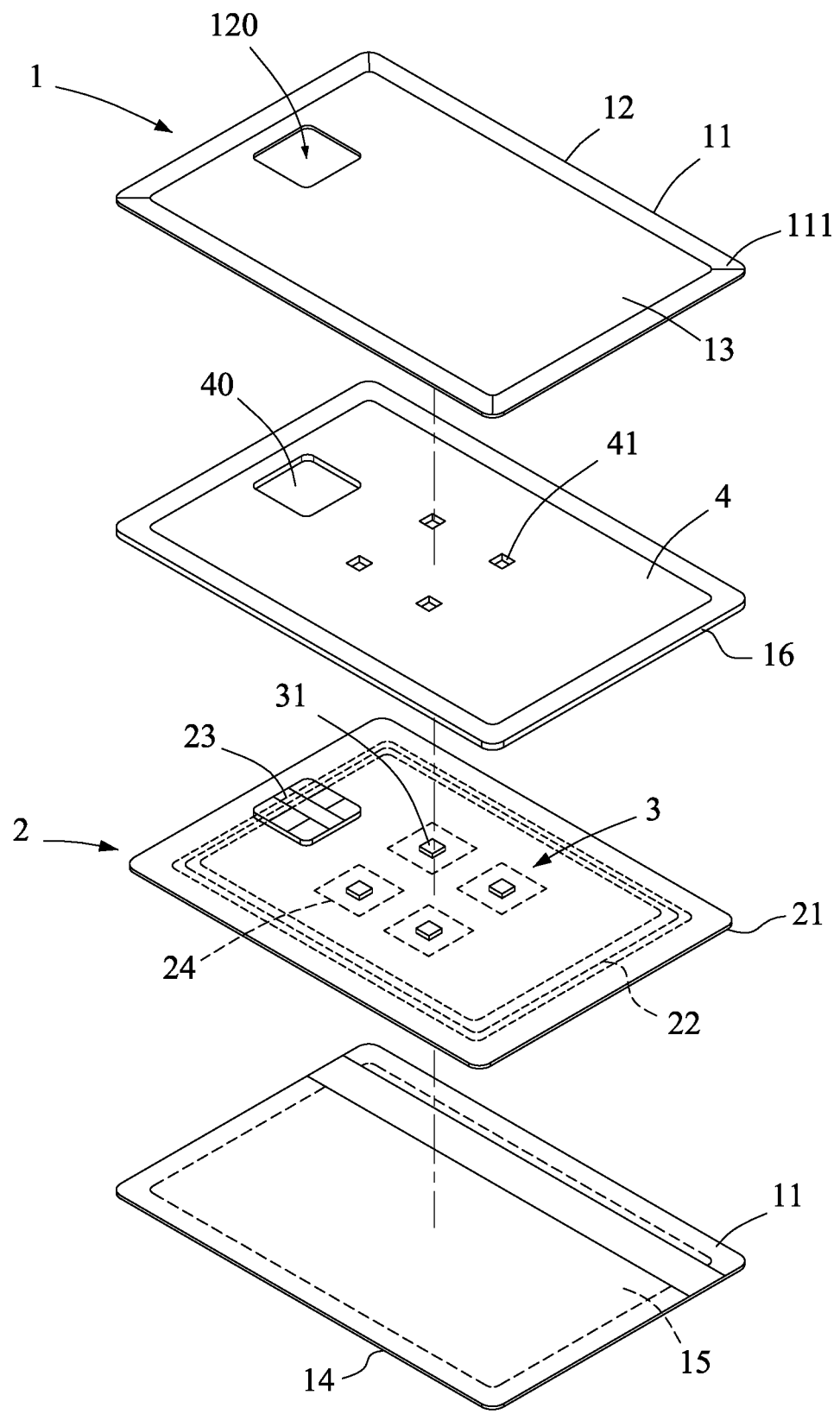
FIG. 1 is an exploded view of an electronic card capable of light-emitting display according to a preferred specific embodiment of the disclosure.
Figure 2:
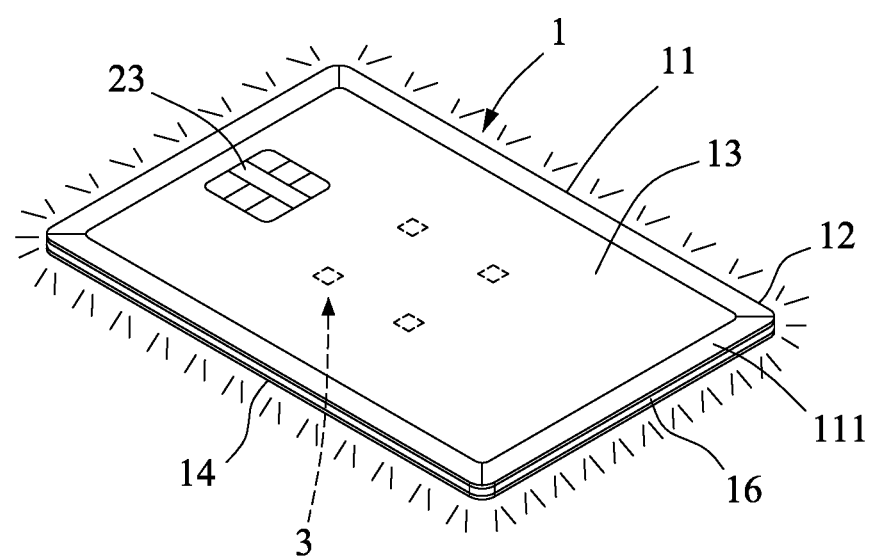
FIG. 2 is a perspective view of the electronic card capable of light-emitting display according to a preferred specific embodiment of the disclosure.
Figure 3:
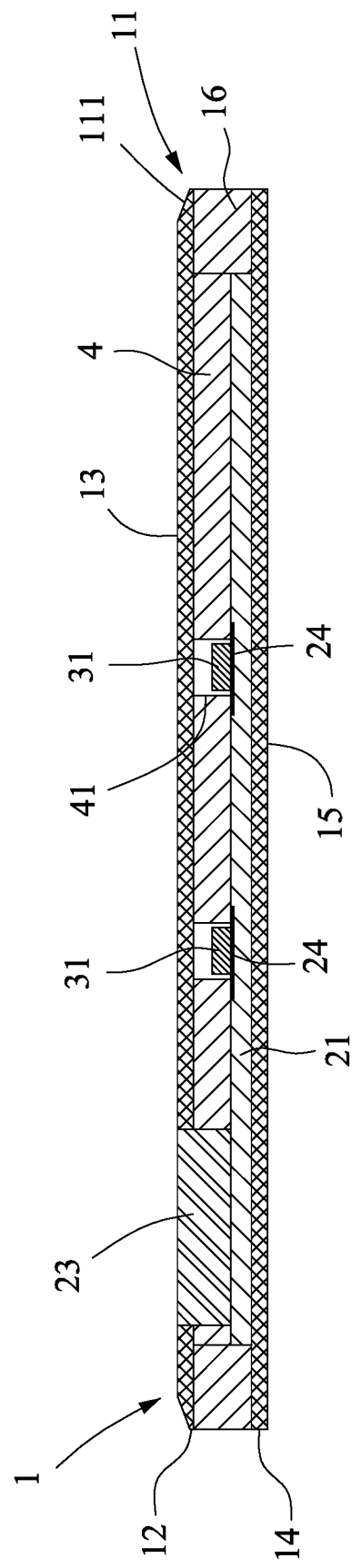
FIG. 3 is a cross-sectional view of the electronic card capable of light-emitting display according to a preferred specific embodiment of the disclosure.

Referring to FIG. 1 through FIG. 3, the disclosure provides an electronic card capable of light-emitting display, comprising a card body 1, an electrical control module 2, a light-emitting module 3 and a light-guiding module 4.

A light-penetrable border portion 11 is disposed on the periphery of the card body 1. An oblique refraction portion 111 is disposed on a surface of the light-penetrable border portion 11. The oblique refraction portion 111 is a frame-shaped oblique refraction surface produced by a grinding process.

The electrical control module 2 is disposed in the card body 1. The electrical control module 2 comprises a circuit control carrier plate 21 and a non-contact type radio-frequency antenna 22 or a contact type communication chip 23. The non-contact type radio-frequency antenna 22 is disposed at the circuit control carrier plate 21. The contact type communication chip 23 is disposed at the circuit control carrier plate 21. The non-contact type radio-frequency antenna 22 and the contact type communication chip 23 are concurrently disposed at the circuit control carrier plate 21.

The light-emitting module 3 is disposed in the card body 1 and electrically connected to the circuit control carrier plate 21.

The light-guiding module 4 is disposed in the card body 1 and corresponds in position to the light-emitting module 3. Light emitted from the light-emitting module 3 is guided by the light-guiding module 4 to the light-penetrable border portion 11 of the card body 1.

To carry out exchange of personal data or transaction data with the card body 1, a user places the card body 1 near a reading module so as for the reading module to induce the non-contact type radio-frequency antenna 22. Alternatively, to carry out exchange of personal data or transaction data with the card body 1, the user inserts the card body 1 into the reading module so as for the reading module to come into contact with the contact type communication chip 23 (not shown). Thus, the electrical control module 2 is powered by electric power from the reading module through the non-contact type radio-frequency antenna 22 or the contact type communication chip 23, allowing the exchange of personal data or transaction data to take place between the electrical control module 2 and the reading module through the circuit control carrier plate 21 and the non-contact type radio-frequency antenna 22 or the contact type communication chip 23. Furthermore, the electrical control module 2 thus powered can drive the light-emitting module 3 to emit light, and the light is guided by the light-guiding module 4 to the light-penetrable border portion 11, allowing display light to be emitted from the periphery of the card body 1. The oblique refraction portion 111 is conducive to an increase in the light-emitting area with a view to increasing display light brightness and thereby rendering the user aware of the ongoing exchange of personal data or transaction data. Upon termination of the data exchange and removal of the card body 1, the electrical control module 2 fails to read electromagnetic wave from the reading module and thus causes power interruption; as a result, both the electrical control module 2 and the light-emitting module 3 shut down, and in consequence the light-emitting module 3 no longer emits light, so as to inform the user of the termination of data exchange and the unused status of the card and thereby prevent an unscrupulous dealer from continuing with the use of the card after the termination of data exchange. Thus, the disclosure is advantageous in that, in the course of the personal data or transaction data exchange carried out with the card body 1, the electrical control module 2 drives the light-emitting module 3 to emit light, and then the light is guided by the light-guiding module 4 to the light-penetrable border portion 11, allowing the oblique refraction portion 111 to increase display light brightness. Therefore, the card body 1 displays data exchange information to not only give a reminder but also render the electronic card pleasing in appearance.

In an embodiment of the disclosure, the card body 1 comprises a first light-penetrable panel 12, a first shading portion 13, a second light-penetrable panel 14 and a second shading portion 15. The first light-penetrable panel 12 is coupled to the second light-penetrable panel 14. The first shading portion 13 is disposed on the outer surface of the first light-penetrable panel 12. The second shading portion 15 is disposed on the outer surface of the second light-penetrable panel 14. The oblique refraction portion 111 is disposed on the periphery of the outer surface of the first light-penetrable panel 12. The electrical control module 2, the light-emitting module 3 and the light-guiding module 4 are disposed between the first light-penetrable panel 12 and the second light-penetrable panel 14. The first shading portion 13 is smaller than the first light-penetrable panel 12, and the second shading portion 15 is smaller than the second light-penetrable panel 14, allowing the light-penetrable border portion 11 to form on the periphery of the card body 1. The light-guiding module 4 is disposed between the first shading portion 13 and the second shading portion 15. The light-guiding module 4 is made of transparent PVC, PET, PC or PMMA material.

In the aforesaid embodiment, when light is emitted from the light-emitting module 3 and guided by the light-guiding module 4 to the light-penetrable border portion 11, the light can be precisely guided by the light-guiding module 4 to the light-penetrable border portion 11 because of the masking effect of the first shading portion 13 and the second shading portion 15, allowing display light to be emitted from the periphery of the card body 1. Furthermore, the oblique refraction portion 111 is conducive to an increase in the light-emitting area to thereby increase display light brightness, whereas the oblique refraction portion 111 is conducive to an increase in the oblique area of the angle of tilt on the front side (i.e., the outer surface edge of the first light-penetrable panel 12) of the card body 1, thereby increasing display light brightness. Therefore, the electronic card of the disclosure informs the user of the ongoing exchange of personal data or transaction data to not only give a reminder but also render the electronic card pleasing in appearance. Moreover, the light-guiding module 4 is made of transparent PVC, PET, PC or PMMA material as needed, so as to meet different application needs.

In an embodiment of the disclosure, the first light-penetrable panel 12 and the second light-penetrable panel 14 are coupled together by a light-penetrable coupling portion 16. The light-penetrable coupling portion 16 corresponds in position to the light-penetrable border portion 11 and connects to both the periphery of the light-guiding module 4 and the periphery of the electrical control module 2. Thus, owing to the masking effect of the first shading portion 13 and the second shading portion 15, light can be precisely guided by the light-guiding module 4 to the light-penetrable border portion 11 through the light-penetrable coupling portion 16, and the oblique refraction portion 111 is conducive to an increase in the light-emitting area to thereby increase display light brightness, allowing display light to be emitted from the periphery of the card body 1. Therefore, the electronic card of the disclosure informs the user of the ongoing exchange of personal data or transaction data to not only give a reminder but also render the electronic card pleasing in appearance.

Both the first light-penetrable panel 12 and the second light-penetrable panel 14 are made of transparent ABS, PETG, PVC or PET material. Both the first shading portion 13 and the second shading portion 15 are made of shading ink. Thus, with light beams being effectively masked by the first shading portion 13 and the second shading portion 15, light can be precisely guided by the light-guiding module 4 to the light-penetrable border portion 11 through the light-penetrable coupling portion 16, and the oblique refraction portion 111 is conducive to an increase in the light-emitting area to thereby increase display light brightness, allowing display light to be emitted from the periphery of the card body 1.

Both the first shading portion 13 and the second shading portion 15 can be provided in the form of a full-scale opaque masking layer. Alternatively, a graphical portion (not shown) is superimposed on the first shading portion 13 and the second shading portion 15 so that the card body 1 meets practical needs.

In an embodiment of the disclosure, the first light-penetrable panel 12 and the light-guiding module 4 have opening portions 120, 40 corresponding in position to the contact type communication chip 23, respectively, so that the contact type communication chip 23 is disposed at the card body 1 and exposed therefrom. Thus, the contact type communication chip 23 can come into contact with the reading module to receive electric power therefrom and carry out exchange of personal data or transaction data.

In an embodiment of the disclosure, the light-emitting module 3 has one or a plurality of light-emitting components 31, whereas the light-guiding module 4 has one or a plurality of through holes 41 for receiving the light-emitting components 31. In a preferred embodiment of the disclosure, the light-emitting module 3 has four light-emitting components 31 arranged in a matrix, and the light-guiding module 4 has four through holes 41 for receiving the light-emitting components 31, respectively. Thus, light is emitted from the light-emitting components 31 but masked by the first shading portion 13 and the second shading portion 15, and in consequence light can be precisely guided by the light-guiding module 4 to the light-penetrable border portion 11 through the light-penetrable coupling portion 16, and the oblique refraction portion 111 is conducive to an increase in the light-emitting area to thereby increase display light brightness, allowing uniform display light to be emitted from the periphery of the card body 1. Therefore, the electronic card of the disclosure informs the user of the ongoing exchange of personal data or transaction data to not only give a reminder but also render the electronic card pleasing in appearance.

In an embodiment of the disclosure, the light-emitting components 31 are LEDs so that the light-emitting module 3 is advantageously energy-efficient, compact and highly plastic, allowing the card body 1 to meet practical needs.

In an embodiment of the disclosure, at least one light masking portion 24 is disposed on the other surface of the circuit control carrier plate 21 and under a corresponding one of the light-emitting components 31. Thus, the light masking portions 24 mask the light emitted from the light-emitting components 31 to preclude the leakage of the light of the light-emitting components 31 from under the circuit control carrier plate 21. Thus, the light-emitting components 31 emit stronger light that is guided by the light-guiding module 4 to the light-penetrable border portion 11 through the light-penetrable coupling portion 16. Moreover, the oblique refraction portion 111 is conducive to an increase in the light-emitting area to thereby increase display light brightness, allowing uniform display light to be emitted from the periphery of the card body 1. Therefore, the electronic card of the disclosure informs the user of the ongoing exchange of personal data or transaction data to not only give a reminder but also render the electronic card pleasing in appearance.

The invention is illustrated by preferred embodiments and described above. However, persons skilled in the art understand that the embodiments merely serve an illustrative purpose but must not be interpreted to place limitations on the scope of the invention. All equivalent changes and replacements made to the embodiments must be deemed falling within the scope of the invention. Therefore, the legal protection for the invention must be defined by the appended claims.

What is claimed is:

1. An electronic card capable of light-emitting display, comprising:
    a card body with a light-penetrable border portion disposed on a periphery of the card body and an oblique refraction portion disposed on a surface of the light-penetrable border portion;
    an electrical control module disposed in the card body and comprising a circuit control carrier plate and a non-contact type radio-frequency antenna or a contact type communication chip, the non-contact type radio-frequency antenna being disposed at the circuit control carrier plate, or the contact type communication chip being disposed at the circuit control carrier plate;
    a light-emitting module disposed in the card body and electrically connected to the circuit control carrier plate; and
    a light-guiding module disposed in the card body, corresponding in position to the light-emitting module, and adapted to guide light of the light-emitting module to the light-penetrable border portion of the card body,
    wherein the card body comprises a first light-penetrable panel, a first shading portion, a second light-penetrable panel and a second shading portion, the first light-penetrable panel being coupled to the second light-penetrable panel, the first shading portion being disposed at the first light-penetrable panel, and the second shading portion being disposed at the second light-penetrable panel, wherein the oblique refraction portion is disposed at the first light-penetrable panel, wherein the electrical control module, the light-emitting module and the light-guiding module are disposed between the first light-penetrable panel and the second light-penetrable panel, and
    wherein the first light-penetrable panel and the second light-penetrable panel are coupled together by a light-penetrable coupling portion, and the light-penetrable coupling portion corresponds in position to the light-penetrable border portion and connects to a periphery of the light-guiding module.

2. The electronic card capable of light-emitting display according to claim 1, wherein the first shading portion is smaller than the first light-penetrable panel, and the second shading portion is smaller than the second light-penetrable panel, allowing the light-penetrable border portion to form on the periphery of the card body.

3. The electronic card capable of light-emitting display according to claim 1, wherein the light-guiding module is disposed between the first shading portion and the second shading portion and made of transparent PVC, PET, PC or PMMA material.

4. The electronic card capable of light-emitting display according to claim 1, wherein the light-emitting module has at least one light-emitting component disposed on a surface of the circuit control carrier plate, and the light-guiding module has a through hole for receiving the light-emitting component.

5. The electronic card capable of light-emitting display according to claim 4, wherein at least one light masking portion is disposed on another surface of the circuit control carrier plate and under the light-emitting component.

* * * * *